No. 11,746. Reissued June 6, 1899.

R. WALSH.

BRAKE SHOE.

(Application filed May 10, 1899.)

Witnesses,
F. F. Mann,
Frederick L. Goodwin

Inventor,
Richard Walsh,
By Offield, Towle & Linthicum,
Att'ys.

UNITED STATES PATENT OFFICE.

RICHARD WALSH, OF CHICAGO, ILLINOIS, ASSIGNOR OF ONE-THIRD TO THOMAS D. PICKARD, OF SAME PLACE.

BRAKE-SHOE.

SPECIFICATION forming part of Reissued Letters Patent No. 11,746, dated June 6, 1899.

Original No. 623,584, dated April 25, 1899. Application for reissue filed May 10, 1899. Serial No. 716,318.

*To all whom it may concern:*

Be it known that I, RICHARD WALSH, of Chicago, in the county of Cook and State of Illinois, have invented certain new and useful Improvements in Brake-Shoes, of which the following is a specification.

This invention relates to brake-shoes, and has for its object to provide a construction whereby a strong and durable brake-shoe may be produced at a comparatively slight expense.

To this end my invention consists in certain novel features, which I will now proceed to describe and will then particularly point out in the claims.

Figure 1:
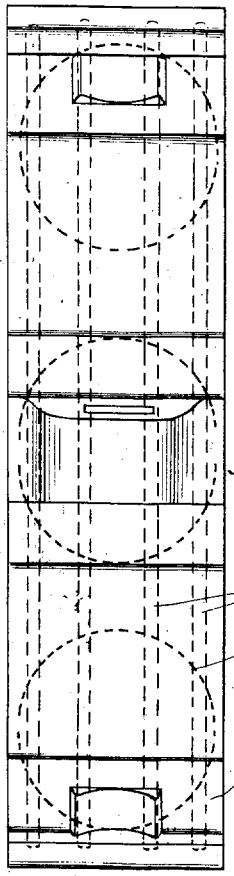
Figure 2:
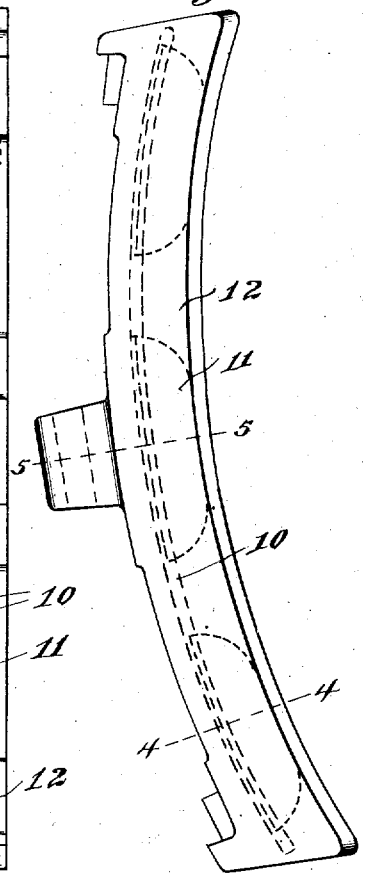
Figure 3:
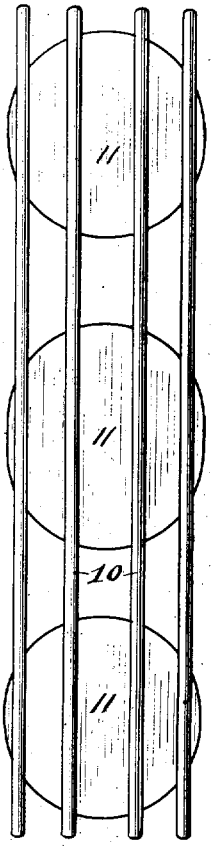
Figure 4:
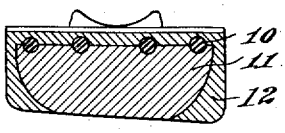
Figure 5:
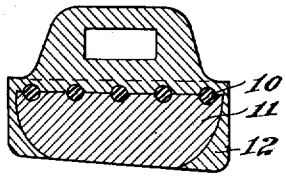

In the accompanying drawings, Figure 1 is a rear elevation of a brake-shoe embodying my invention. Fig. 2 is a side elevation thereof. Fig. 3 is a rear view of the inset before the same is cast into the body of the shoe. Fig. 4 is a transverse sectional view taken on the line 4 4 of Fig. 2, and Fig. 5 is a similar view taken on the line 5 5 of Fig. 2 and illustrating a modified form of my invention.

In carrying out my invention I first provide a plurality of rods 10, preferably of steel. These rods are preferably round rods of about one-quarter of an inch in diameter and of a length slightly less than the length of the completed shoe, being bent to conform to the general curvature of said completed shoe. Any suitable number of these rods may be employed, and in the drawings I have shown in Figs. 1 to 4 a construction in which four such rods are used, while in Fig. 5 I have shown a construction in which five are employed. These rods are placed parallel to each other, and a plurality of insets 11, of chilled iron, are cast thereon in such manner that the rods are embedded to about one-half of their diameter in the rear faces of the insets. The insets are preferably given the form shown in the drawings, being circular in cross-section transversely to their short axis and having a flat front and rear face, the front face being of less diameter than the rear face and the wall of the body between the front and rear faces being curved or inclined outward and rearward from the front to the rear face. I prefer to employ three of these insets, as shown in the drawings, although their number may obviously be varied. The rods 10, with the chilled-iron insets 11 cast thereon in the manner shown in Fig. 3, are then placed in a suitable mold, and the body 12 of the shoe is cast around the same in such a way that the said rods are completely embedded in the cast-metal body of the shoe a slight distance in front of the rear face thereof. The front faces of the insets are by this operation brought flush with the front face of the body of the shoe.

A shoe constructed in accordance with my invention presents various advantageous features. The employment of chilled-metal insets prevents too-rapid wearing of the face of the shoe while in use and at the same time regulates the holding power thereof. As the shoe wears down it grows thinner until its resistance to the strains of use decreases, and in the absence of any provision for maintaining this strength at a suitable point the shoe breaks by reason of its thinness. By the employment, however, of the steel rods embedded in the body of the shoe the shoe may be used until worn down to such a degree of thinness that the outer portions of said rods are exposed to contact with the wheel without so weakening the shoe as to cause it to break under the strains of use. By embedding the rods only partially in the chilled-metal insets I obtain a longer period of wear, for the reason that the wheels will not come into contact with the rods as soon as they would if the rods were entirely embedded in the insets, and thus brought so much closer to the working face of the shoe. By giving to the body of the insets the curved or inclined shape described and shown I prevent the formation of a sharp angle or cutting edge as the insets wear away, so that the tendency to cut or wear the wheel or wheel-tire is diminished.

The precise form of construction hereinbefore described is that which I prefer; but while some of its features are desirable and form subsidiary features of my invention I do not wish to be understood as limiting myself strictly to the details hereinbefore described and shown in the accompanying drawings, as these details may obviously be modified without departing from the broader principles of my invention. For instance, while I have described the longitudinally-extending rods as made of steel and prefer this material under most circumstances, it is obvious that other materials having the characteristics of steel required in this particular location and combination of elements may be substituted therefor—as, for instance, wrought-iron or any other tough metal adapted to withstand tensile and transverse strains without fracture, and thereby supply the requisite characteristics to offset the weakness arising from the brittleness of the cast-iron when used alone.

I claim—

1. A brake-shoe comprising a cast-iron body, a plurality of chilled-iron insets embedded therein, and a plurality of longitudinally-extending rods of steel or the like connecting said insets and embedded in the cast-iron body of the shoe, substantially as described.

2. A brake-shoe comprising a plurality of chilled-iron insets, a plurality of longitudinally-extending rods of steel or the like connecting said insets and partially embedded therein, and a cast-iron body inclosing said insets and rods, the front faces of the insets being exposed, substantially as described.

3. A brake-shoe comprising a cast-iron body, a plurality of chilled-iron insets embedded therein at separated points and each having a body circular in cross-section, an exposed front face of less diameter than its inclosed rear face, and an outwardly and rearwardly curved body-wall connecting the front and rear faces, and a plurality of longitudinally-extending rods of steel or the like connecting said insets and embedded in the cast-iron body of the shoe, substantially as described.

RICHARD WALSH.

Witnesses:
FREDERICK C. GOODWIN,
IRVINE MILLER.